United States Patent [19]

Hamamoto et al.

[11] Patent Number: 5,270,516
[45] Date of Patent: Dec. 14, 1993

[54] ARC WELDING MACHINE

[75] Inventors: Koji Hamamoto, Takarazuka; Naoki Kawai, Ikeda; Junzo Tanimoto, Toyonaka; Tetsu Innami, Osaka; Yoshinori Nishida, Toyonaka, all of Japan

[73] Assignee: Matsushita Electric Industrial Co., Ltd., Osaka, Japan

[21] Appl. No.: 858,937

[22] Filed: Mar. 26, 1992

[30] Foreign Application Priority Data

Apr. 1, 1991 [JP] Japan .................... 3-068273
Apr. 23, 1991 [JP] Japan .................... 3-092066
Apr. 23, 1991 [JP] Japan .................... 3-092067

[51] Int. Cl.$^5$ ............................... B23K 9/095
[52] U.S. Cl. .................. 219/130.33; 219/130.21
[58] Field of Search ............ 219/130.33, 130.32, 219/130.31, 130.21, 137 PS, 137.71, 124.34; 364/162

[56] References Cited

U.S. PATENT DOCUMENTS

| | | | |
|---|---|---|---|
| 4,529,864 | 7/1985 | Bennett | 219/137.71 |
| 4,533,817 | 8/1985 | Makimaa | 219/137.71 |
| 4,665,299 | 5/1987 | Iwata | 219/130.21 |
| 4,922,174 | 5/1990 | Pietrzak et al. | 219/124.34 |
| 5,043,862 | 8/1991 | Takahashi et al. | 364/162 |

FOREIGN PATENT DOCUMENTS

| | | |
|---|---|---|
| 0300367 | 1/1989 | European Pat. Off. |
| 0426870 | 5/1991 | European Pat. Off. |
| 62-234663 | 10/1987 | Japan |
| 1456290 | 2/1989 | World Int. Prop. O. |

OTHER PUBLICATIONS

Von Altrock, C., "Uber den Daumen gepeilt, Fuzzy Logic: scharfe theorie der unscharfen Mengen", CT Magazin fur Computer Technik, pp. 188-206, Mar. 1, 1991.

*Primary Examiner*—Clifford C. Shaw
*Attorney, Agent, or Firm*—Stevens, Davis, Miller & Mosher

[57] ABSTRACT

An arc welding machine comprises an output control circuit which produces an arc output in accordance with output control signal, an output detection circuit which measures the state of arc output and produces a feedback signal indicative of the output arc state, and a fuzzy inference control circuit which introduces the feedback signal, produces a welding current waveform and welding voltage waveform required to produce the optimal arc state based on the fuzzy inference, and delivers the resulting waveforms to the output control circuit as the output control signal.

6 Claims, 8 Drawing Sheets

NB : NEGATIVE BIG
NS : NEGATIVE SMALL
ZO : ZERO
PS : POSITIVE SMALL
PB : POSITIVE BIG $L : \begin{cases} SS \\ AS \\ VS \end{cases}$

S : SMALL
M : MEDIUM
B : BIG $$L : \begin{cases} Ia\,(Ia') \\ Va\,(Va') \\ Ts_0\,(Ts_1) \\ Ta_0 \\ Ip_0 \\ Ib_0\,(Ib_1) \end{cases}$$

MEMBERSHIP FUNCTION

N : SHORT (NEGATIVE)
Z : NORMAL (ZERO)
PS : SLIGHTLY LONG (POSITIVE SMALL)
PM : LONG (POSITIVE MEDIUM)
PB : VERY LONG (POSITIVE BIG)
L : STICKOUT LENGTH
b : CONSTANT

ABC WELDING MACHINE

BACKGROUND OF THE INVENTION

This invention relates to a power supply unit used for arc welding work.

Conventional arc welding machines are controlled for the welding output power through the selection of an output value in a fixed power range in accordance with the predetermined rule of operation of a differential amplifier or the like which has a feedback of the state of arc. The welding output power is also controlled through the detection of a transition from the state of arcing to the state of short-circuiting and vice versa, and the switching of the output waveform according to the result of detection.

As a typical example of the consumable electrode arc welding work, the $CO_2$ welding work will be explained in detail. In this welding work, the stickout length is normally set from 10 to 20 mm. However, in welding a structure, of complex shape or a large structure which involves narrow deep sections, the tip of the welding torch cannot access the welding position in some cases. In these cases, it is inevitable to carry out the welding work with a stickout length as long as 50 mm, and the operation may encounter difficulty in maintaining a constant stickout length depending on the degree of expertise of the welding worker.

With a longer stickout length, the arc becomes unstable, which causes a deficiency of beads, resulting in a defective junction in that portion, or causes an uneven bead width or a too small average bead width, or causes insuffient melting.

In order to prevent the above-mentioned adverse inference on the result of welding and the condition of operation, the welding work with a longer stickout length is carried out with its welding voltage adjusted higher than, the usual condition. However, if the stickout length is short, while the welding output voltage is adjusted higher, such a trouble as melt-sticking of the wire to the electrode can emerge, and on this account it is necessary to re-adjust the output voltage each time the stickout length varies.

However, the foregoing welding power control based on the selection of an output value in a fixed power range in accordance with the predetermined rule of operation in response to the fed-back arc state, in which the selected output signal is in a one-to-one relation with the feedback signal, does not necessarily select the optimal output signal for stabilizing the immediate state of the arc, and this is a cause of instability of arcing. In addition, if the control loop gain is set too small, the power output cannot respond immediately to a change in the state of arc, or if the loop gain is set too large, the output power overshoots, making the arc more unstable.

Moreover, the welding power control based on the switching of the output waveform by detecting the transition between the state of arcing and the state of short-circuiting under the foregoing feedback control is subjected to a delay of waveform switching, resulting in an improper output waveform for maintaining the optimal arc, which causes the disturbance of the output power. Since the initial phase of short-circuiting cannot be predicted, the emergence of a small-scale short-circuiting cannot be brought to a positive short-circuit state, and this causes the emergence of sputtering and uneven transition to the short-circuit state because of a varying period of transition, resulting in a poor appearance of beads.

In the semi-automatic welding work, the operation needs to be halted for the output adjustment each time the butt length varies as mentioned above, which makes the welding work awkward and inefficient and also adversely affects the quality of welding. It is very difficult to measure from outside the stickout length of welding which goes on currently or the stickout length for the subsequent welding operation, and therefore the welding power must be adjusted on a trial-and-error basis, which imposes increased problems on the efficiency of work and on the degradation of welding quality caused by improper adjustment.

SUMMARY OF THE INVENTION

The present invention is intended to overcome the foregoing prior art deficiencies, and its prime object is to provide an arc welding machine which produces the optimal output power by using multiple feedback signals through inference based on fuzzy theory.

Another object of this invention is to provide an arc welding machine which produces the optimal output power through the measurement of the period of transition between the state of of arcing and the state of short-circuiting based on the feedback signals and the prediction of the next state transition through inference based on fuzzy theory.

Still another object of this invention is to provide an arc welding machine which calculates the stickout length automatically during the welding operation and implements the power adjustment automatically based on the calculation result, thereby enhancing the efficiency of welding work and the quality of welding.

The power supply unit for the arc welding work based on this invention comprises an output control means which produces an arc output in accordance with the output control signal, an output detection means which measures the state of arc output and produces feedback signals indicative of the arc state, and a fuzzy inference control means which introduces the feedback signals, produces a welding current waveform and welding voltage waveform required to produce the optimal arc state based on fuzzy theory, and delivers the resulting waveforms to the output control means as the output control signal.

More specifically, the output detection means includes a signal conversion means which introduces the output arc voltage signal indicative of the arc voltage and the output arc current signal indicative of the arc current and produces an output arc voltage value signal and output arc current value signal, and a short-circuit event count means which introduces the output arc voltage signal, counts the number of events of contact between the welding wire, which is a consumable electrode, and the object of welding in a certain time period, and produces a short-circuit event count signal. The fuzzy inference control means includes a base power setting means which reads out a base output current waveform and a base output voltage waveform selectively from a data bank memory and delivers the waveforms as base output signals, and a fuzzy inference means which introduces the base output signals, output arc voltage value signal, output arc current value signal and short-circuit event count signal, implements the inference in accordance with the predetermined rules based on fuzzy theory, and produces an output control signal which achieves the welding output current waveform and voltage waveform needed for the achievement of the optimal arc state.

The output detection means includes a current detection means which measures the output current and produces a current value signal, a voltage detection means which measures the output voltage and produces a voltage value signal, and a short-circuiting/arcing period measuring means which introduces the voltage value signal to measure the time length since the beginning of previous short-circuiting until arc generation and the time length since arc generation until short-circuiting and produces a short-circuit/arc period signal. The fuzzy inference control means includes a fuzzy inference means which introduces the current value signal, voltage value signal and short-circuit/arc period signal, implements a fuzzy inference based on the predetermined rule to predict the time length since the transition from the previous arcing to short-circuiting until the transition from the next short-circuiting to arcing, or the time length since the transition from the previous short-circuiting to arcing until the transition from the next arcing to short-circuiting, and produces an inference signal, and a waveform control means which introduces the inference signal and produces signals of output waveforms for achieving the optimal state of arc.

The output detection means includes a current detection means which detects the welding current, a current value calculation means which introduces the output of the current detection means and calculates the mean value and effective value of the output current, and a wire feed rate detection means which detects the feed speed of wire which is a consumable electrode. The fuzzy inference control means includes a stickout length calculation means which calculates the distance between the welding object and the electrode based on the calculation result provided by the current value calculation means and the detection result provided by the feed rate detection means, a fuzzy inference means which introduces the calculation result provided by the stickout length calculation means as an input variable and evaluates the output setting value in accordance with the predetermined rule based on the fuzzy inference, and an output setting means which reads out the optimal output value from the database memory in response to the output setting value and sets the welding output.

According to this invention, the welding machine operates through the inference based on fuzzy theory in response to the reference signals and the feedback signals indicative of the state of arc, whereby the output waveform can be controlled to achieve the optimal state of arc.

According to this invention, the welding machine operates through an inference based on fuzzy theory in response to the period of transition between short-circuiting and arcing evaluated from the feedback signals as well as to the measured current value and voltage value thereby to predict the next transition between short-circuiting and arcing, whereby the output waveform can be controlled to achieve the optimal state of arc.

According to this invention, the welding machine is capable of calculating the stickout length during the welding operation from the mean value and effective value of output current and the wire feed rate to adjust the output condition promptly and automatically based on the calculation result, whereby the efficiency of welding work and the quality of welding can be improved.

DESCRIPTION OF THE PREFERRED EMBODIMENTS

The first embodiment of this invention will be explained with reference to the drawings.

Figure 1:
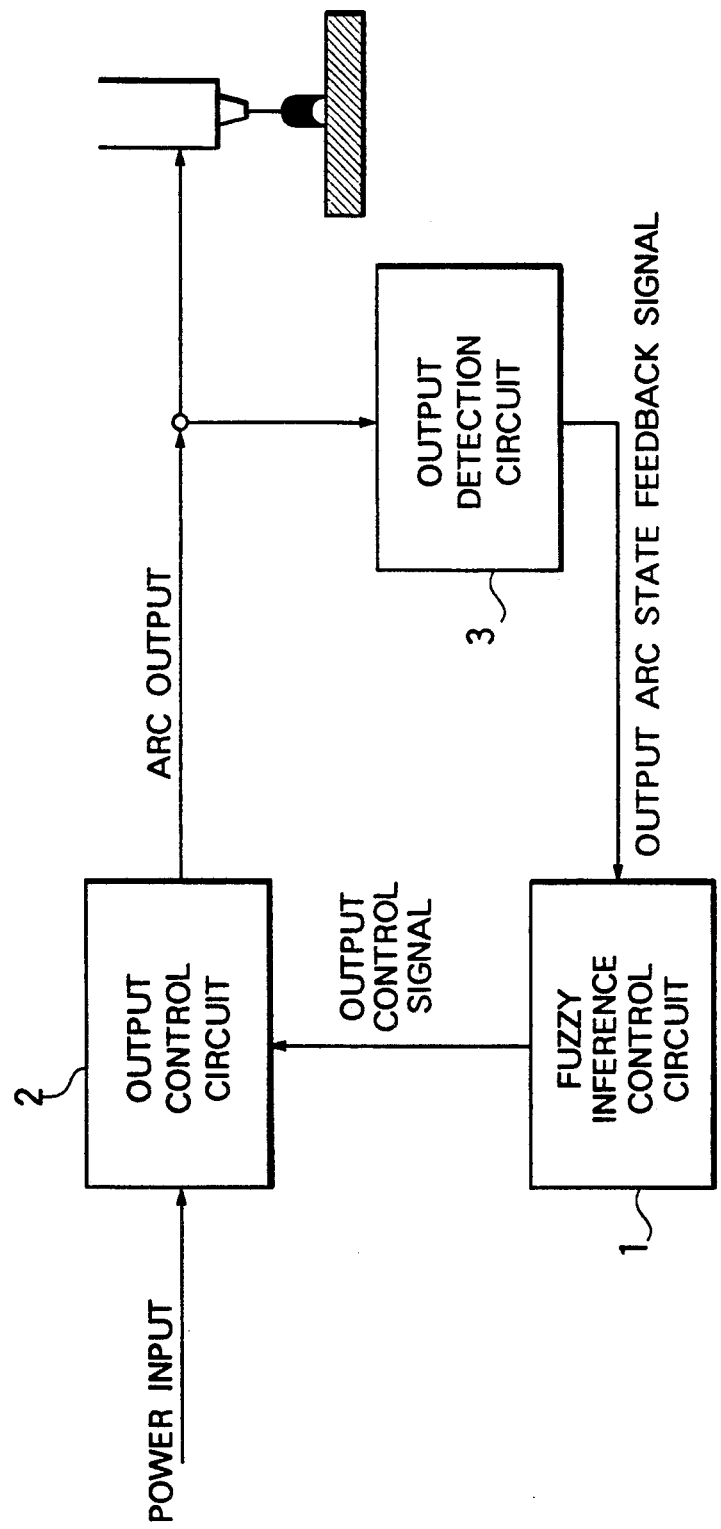
FIG. 1 is a block diagram showing the first embodiment of this invention.

In the block diagram of FIG. 1, reference numeral 1 denotes a fuzzy inference control circuit, 2 is an output control circuit, and 3 is an output detection circuit. Indicated by FBS is a feedback signal indicative of the state of arc produced by the output detection circuit 3 and sent to the fuzzy inference control circuit 1, and CS is an output control signal produced by the fuzzy inference control circuit 1 and sent to the output control circuit 2.

The output detection circuit 3 measures the present state of arc which is being maneuvered by the output control circuit 2 that is the actuator of the welding machine, and produces the arc-state feedback signal FBS. The fuzzy inference control circuit 1 receives the arc-state feedback signal FBS, implements a fuzzy inference for producing the output waveform for achieving the optimal state of arc based on the preset membership function, and delivers the resulting output control signal CS. The output control circuit 2 performs the arc control in accordance with the output control signal CS.

The second embodiment of this invention will be explained with reference to the drawings.

Figure 2:
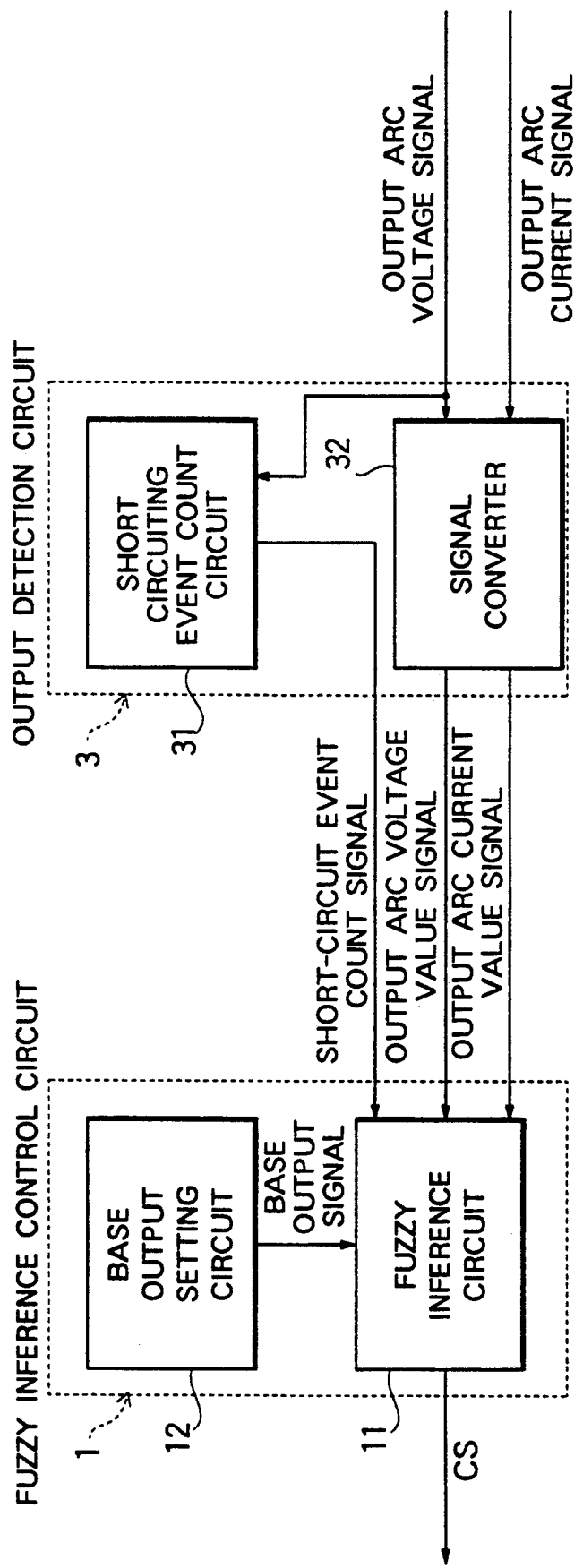
FIG. 2 is a block diagram showing the second embodiment of this invention.

In FIG. 2, the fuzzy inference control circuit 1 includes a fuzzy inference circuit 11 and a base output setting circuit 12, and the output detection circuit 3 includes a short-circuit event count circuit 31 and a signal conversion circuit 32.

The signal conversion circuit 32 introduces the arc current value and arc voltage value, which reflect the present operation of the welding machine, as an output arc current signal Ao and output arc voltage signal Vo, and delivers an output arc current signal AS and output arc voltage signal VS.

The short-circuit event count circuit 31 monitors the output arc voltage signal Vo and determines the occurrence of short-circuiting of the wire on detecting a falling voltage below a certain level, and counts the number of events of short-circuiting in a certain time period to produce a short-circuit event count signal SS.

The base output setting circuit 12 reads out selectively from the data bank memory a base welding output current waveform and voltage waveform for the welding output current and voltage command values given from the outside, and delivers a resulting base output signal KS.

The fuzzy inference circuit 11 introduces the base output signal KS, the short-circuit event count signal SS, the output arc current value signal AS and output arc voltage value signal VS, renders weights to the signals SS, AS and VS in the form of membership function, implements a fuzzy inference based on a predetermined rule, adjusts finely the base output signal KS in accordance with the inference result, and delivers an output control signal CS for controlling the output values so as to achieve the optimal state of arc.

Figure 3:
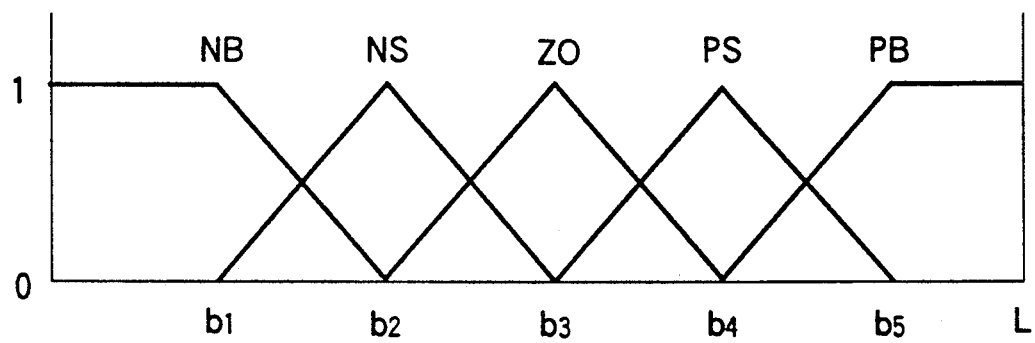
FIG. 3 is a diagram explaining the membership function of the second embodiment of this invention.

FIG. 3 is a graph showing the membership function of the short-circuit event count signal SS, output arc current value signal AS and output arc voltage value signal VS, and the following are expressions of the membership function.

membership function of fuzzy variable NB (X: input variable)

$$\mu_A(X) = \begin{cases} 1 & X \leq b_1 \\ 1 - (X - b_1)/(b_2 - b_1) & b_1 \leq X \leq b_2 \\ 0 & b_2 \leq X \end{cases}$$

membership function of fuzzy variables NS, ZO and PS (N=2, 3, 4)

$$\mu_A(X) = \max(0, 1 - |X - b_n|/(b_{n+1} - b_n))$$

membership function of fuzzy variable PB $$\mu_A(X) = \begin{cases} 0 & X \leq b_4 \\ (X - b_4)/(b_5 - b_4) & b_4 \leq X \leq b_5 \\ 1 & b_5 \leq X \end{cases}$$

Rules of fuzzy inference are established in advance based on an experience of skilled welding workers, and each rule takes the IF-THEN form of three inputs and one output as follows.

If AS=NS and VS=ZO and SS=PS then C1S=A1
If AS=ZO and VS=ZO and SS=PS then C2S=A2
If AS=NB and VS=ZO and SS=PS then C3S=A3
If AS=NS and VS=NS and SS=ZO then C4S=A4
If AS=ZO and VS=NS and SS=ZO then C5S=A5
If AS=NB and VS=NS and SS=ZO then C6S=A6
If ... and ... and ... then CnS=An The fuzzy inference process adopted in this embodiment is a simplified fuzzy inference that is used commonly in home appliances and the like, and it works as follows. Among the constant values A1–An in the THEN clause, those with the presence of membership values (any value greater than zero) of the short-circuit event count signal SS, output arc current value signal AS and output arc voltage value signal VS are picked up as CnS values; their centroid, i.e., mean value, is evaluated as the output of the fuzzy inference circuit 11; and the base output signal KS is adjusted based on it to produce the output control signal CS. Accordingly, it is not necessary to calculate membership values for individual input signals. Instead, all CnS values for possible input signal values are prepared as a lookup table, and a output control signal CS is calculated from the CnS values read out of the table.

The fuzzy inference circuit 11 and base output setting circuit 12 can readily be realized with a microprocessor or the like, and the short-circuit event count circuit 31 can readily be realized with a comparator, counter, etc. configured as integrated circuits.

Although the fuzzy inference circuit 11 of this embodiment adopts a simplified fuzzy inference based on a lookup table for delivering the output of THEN clause of rule, the circuit may employ a formal fuzzy inference in which both the IF clause and THEN clause are treated in the form of membership functions.

The third embodiment of this invention will be explained with reference to the drawings.

Figure 4:
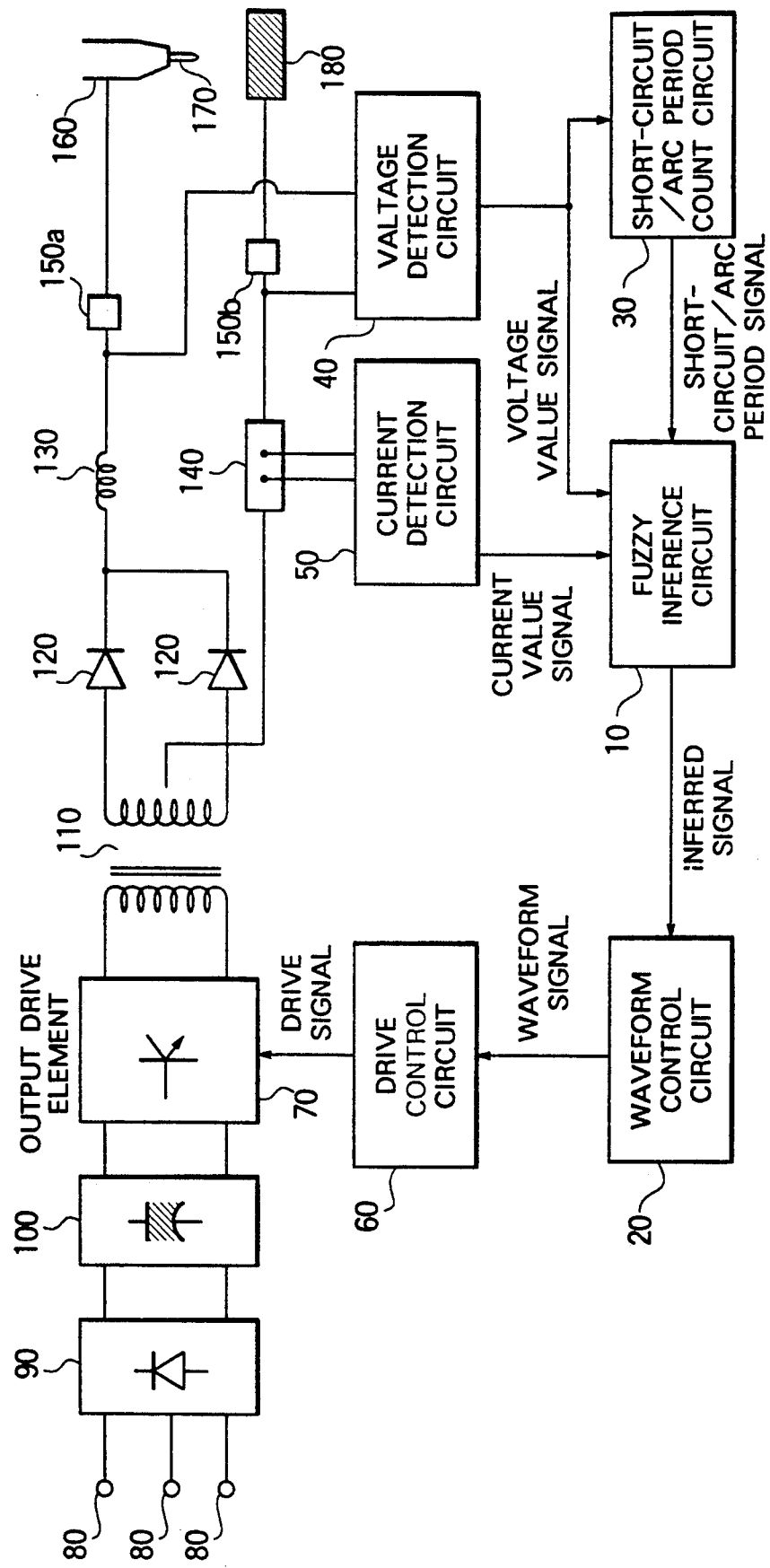
FIG. 4 is a block diagram showing the third embodiment of this invention.

In the block diagram of FIG. 4, reference symbol 10 denotes a fuzzy inference circuit, 20 is a waveform control circuit, 30 is a short-circuiting/arcing period measuring circuit, 40 is a voltage detection circuit, 50 is a current detection circuit, 60 is a drive control circuit, 70 is an output drive element, 80 is an input terminal, 90 is a primary rectifier, 100 is a capacitor, 110 is a main transformer, 120 is a secondary rectifier, 130 is a reactor, 140 is a current transformer, 150a and 150b are output terminals, 160 is a current contact chip, 170 is a welding wire, and 180 is a welding object.

Next, each constituting element will be explained in detail.

The current detection circuit 50 measures the output arc current by using the current transformer 140, and produces a current value signal AS which consists of an instantaneous component and average component. The voltage detection means 40 measures the output arc voltage between the output terminals 150a and 150b, and produces a voltage value signal VS which consists of an instantaneous component and average component. The short-circuiting/arcing period measuring circuit 30 introduces the voltage value signal VS provided by the voltage detection circuit 40, determines the state of short-circuit or arcing between the welding wire 170 and welding object 180 based on the instantaneous component of the signal, measures the time length since the beginning of short-circuiting until arcing and the time length since arcing until the beginning of short-circuiting, and delivers a resulting short-circuit/arc period signal FS.

The fuzzy inference circuit 10 introduces the current value signal AS, voltage value signal VS and short-circuit/arc period signal FS thereby to extract the instantaneous component and average component of the current value signal AS, the average component of the voltage value signal VS, the time time length since the beginning of short-circuiting until arcing, and the time length since arcing until the beginning of arcing as parameters of inference, infers the time length from the next beginning of short-circuiting to arcing or from arcing to short-circuiting based on multiplexed fuzzy inference theory, and delivers the result of inference as an inference signal LS. The fuzzy inference circuit 10 can readily be realized with a microprocessor or the like.

The waveform control circuit 20 produces an output waveform by combining output waveforms at the next short-circuiting and arcing read out of the internal data bank memory in response to the inference signal LS provided by the fuzzy inference circuit 10, and delivers a waveform signal WS. The drive control circuit 60 introduces the waveform signal WS, transforms it into a drive signal DS, and delivers the signal DS to the output drive element 70.

Figure 5A:
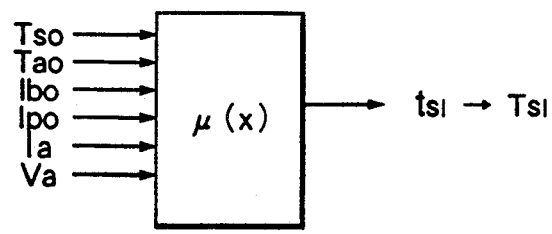
FIGS. 5A and 5B are a set of diagrams used to explain the operation of the fuzzy inference means of the third embodiment of this invention.
Figure 5B:
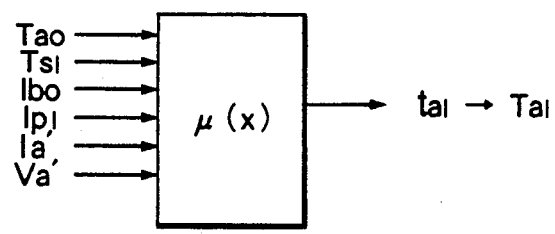
Figure 6A:
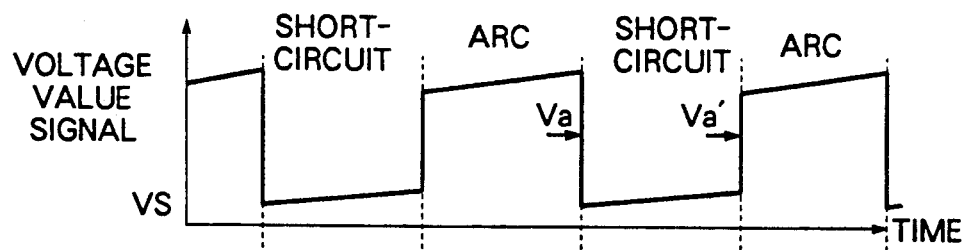
FIGS. 6A and 6B are a set of waveform diagrams showing the voltage signal and current signal of the third embodiment of this invention.
Figure 6B:
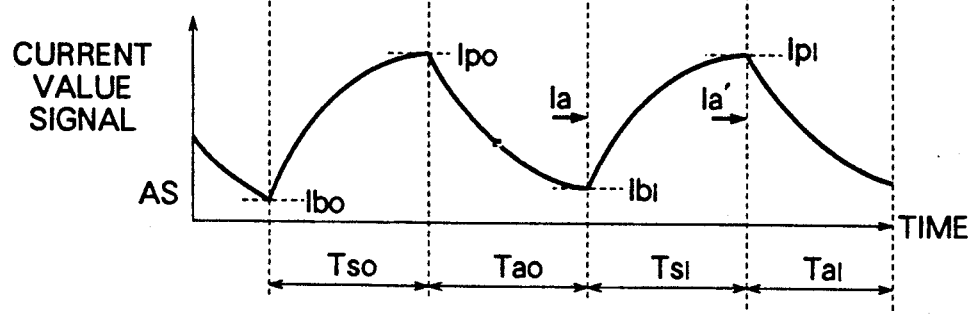

FIG. 5 is a set of diagrams used to explain the operation of the fuzzy inference circuit 10, and FIG. 6 is a set of waveform diagrams showing the voltage value signal and current value signal. The fuzzy inference circuit 10 bases its operation on multiplexed fuzzy inference theory and evaluates the output of the membership function $\mu(x)$ based on the max-min composed centroid method. The inference circuit has six inputs as shown in FIGS. 5A and 5B, and it implements the inference in accordance with the predetermined rule to produce an output ts1 or ta1. For example, for inferring the present short-circuiting time TS1, the circuit introduces into the membership function $\mu(x)$ the previous short-circuiting time TS0, the previous arcing time Ta0, the current value at the previous transition from arcing to short-circuiting Ib0, the current value at the previous transition from short-circuiting to arcing IP0, and the output average current value Ia and average voltage value Va of the present short-circuiting/arcing period, implements an inference in accordance with a predetermined rule, and produces a present inferenced short-circuiting time tS1, as shown in FIG. 5A. For inferring the present arcing time Ta1, the circuit introduces into the membership function $\mu(x)$ the previous arcing time Ta0, the present short-circuiting time TS1, the current value at the previous transition from short-circuiting to arcing IP0, the current value at the present transition from arcing to short-circuiting Ib1, and the output average current value Ia' and output average voltage value Va' of the previous short-circuiting/arcing period, implements an inference in accordance with a predetermined rule, and produces an inferenced arcing time ta1, as shown in FIG. 5B.

Figure 7:
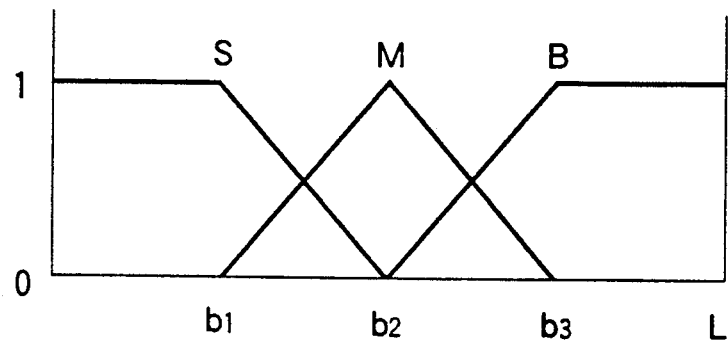
FIG. 7 is a diagram explaining the membership function of the third embodiment of this invention.

FIG. 7 is a graph showing the membership function of the input variables Ia, Ia', Va, Va', TS0, TS1, Ta1, Ta0, IP0, Ib0, and Ib1 in the IF clause, and the following are expressions of the membership function.

membership function of fuzzy variable S (X: input variable)

$$\mu_A(X) = \begin{cases} 1 & X \leq b_1 \\ 1 - (X - b_1)/(b_2 - b_1) & b_1 \leq X \leq b_2 \\ 0 & b_2 \leq X \end{cases}$$

membership function of fuzzy variables M $$\mu_A(X) = \max(0, 1 - |X - b_2|/(b_3 - b_2))$$

membership function of fuzzy variable B $$\mu_A(X) = \begin{cases} 0 & X \leq b_2 \\ (X - b_2)/(b_3 - b_2) & b_2 \leq X \leq b_3 \\ 1 & b_3 \leq X \end{cases}$$

The membership function for producing the output values tS1 and ta1 has three variables as in the previous embodiment.

Rules of fuzzy inference are established in advance based on the experience of skilled welding workers, and each rule takes an IF-THEN form of six inputs and one output as follows.

Ia=S, Va=M, TS0=M, Ta0=M, IP0=M, and Ib1=M
then tS1=M

Ia'=S, Va'=M, TS1=M, Ta0=M, IP0=M, and Ib1=M
then ta1=M

Ia=B, Va=S, TS0=S, Ta0=B, IP0=M, and Ib0=S
then tS1=B

The fuzzy inference circuit bases its operation on multiplexed fuzzy inference theory and evaluates the output based on the max-min composed centroid method.

The fourth embodiment of this invention will be explained with reference to the drawings.

Figure 8:
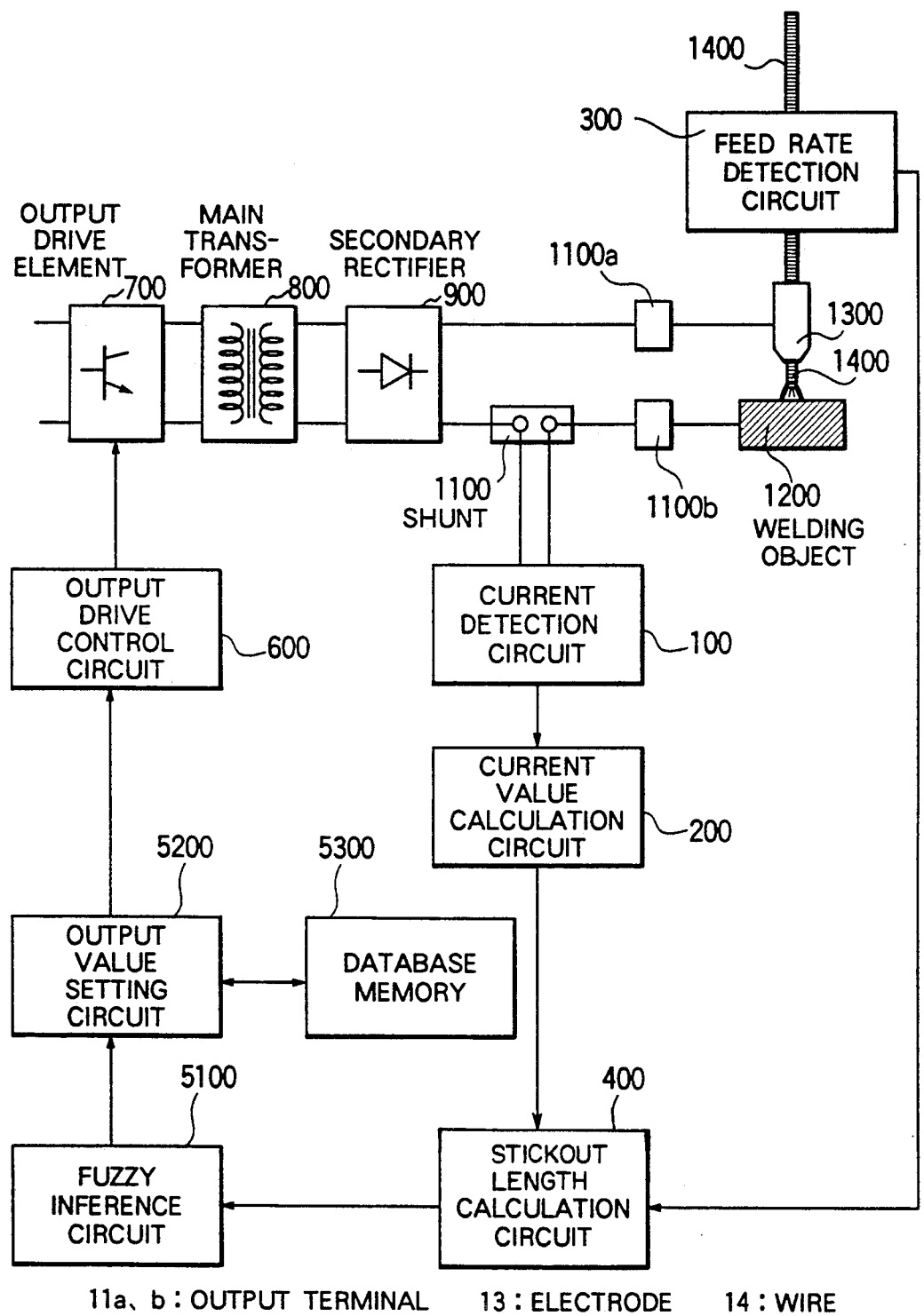
FIG. 8 is a block diagram showing the fourth embodiment of this invention.

In the block diagram of FIG. 8, reference symbol 100 denotes a current detection circuit, 200 is a current value calculation circuit, 300 is a wire feed rate detection circuit, 400 is a stickout length calculation circuit, 5100 is a fuzzy inference circuit, 5200 is an output value setting circuit, 5300 is a database memory, 600 is an output drive control circuit, 700 is an output drive element, 800 is a main transformer, 900 is a secondary rectifier, 1000 is a shunt device, 1100a and 1100b are output terminals, 1200 is a welding object, 1300 is an electrode, and 1400 is a wire which is a consumable electrode.

The operation of the power supply unit for the consumable electrode welding machine arranged as described above will be explained.

The current detection circuit 100 detects the value of present welding current by means of the shunt device 1000 placed between the secondary rectifier 900 and output terminal 1100 and produces a current value signal. The current calculation circuit 200 receives the current value signal from the current detection circuit 100 and calculates the mean value and effective value of the output current by means of a microcomputer or the like. The feed rate detection circuit 300 counts the number of revolutions of a roller which is in contact with the consumable electrode wire 1400 and coupled with a rotary encoder or tachogenerator thereby to evaluate the feed rate of the wire, and produces a feed rate signal. The stickout length calculation circuit 400 introduces the mean value and effective value of the output current and the wire feed rate, and calculates the stickout length. The fuzzy inference circuit 5100 introduces the stickout length calculated by the stickout length calculation circuit 400, assesses the butt length into five categories of "short", "normal", "slightly long", "long" and "very long", implements the weighting operation in accordance with the membership function, and produces a signal indicative of the adjustment value of the welding output from the result of inference. The output value setting circuit 5200 reads out an adjustment value from the database memory in response to the command signal from the fuzzy inference circuit 5100, and delivers the output adjustment value to the output drive control circuit 600.

The following is the expression used to calculate the stickout length in this embodiment.

$$L = \frac{\alpha V - \beta Ia}{\gamma Ir^2}$$

L: stickout length

Figure 9:
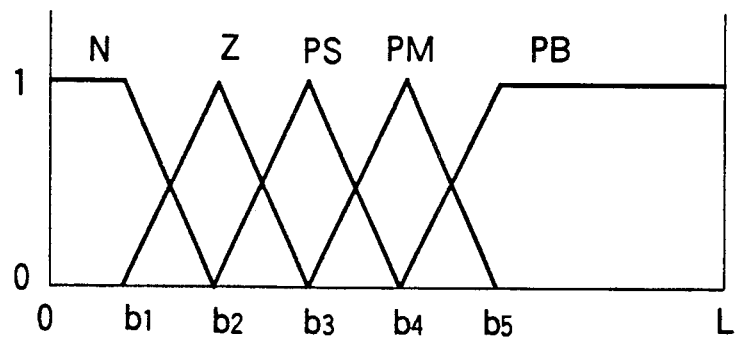
FIG. 9 is a diagram explaining the membership function of the fourth embodiment of this invention.

V: wire feed rate
Ia: average output current
Ir: effective output current
α: constant
β: constant
γ: constant FIG. 9 is a graph showing the membership function used in this embodiment, and the following are expressions of the membership function.

membership function of fuzzy variable N (X: input variable)

$$\mu_A(X) = \begin{cases} 1 & X \leq b_1 \\ 1 - (X - b_1)/(b_2 - b_1) & b_1 \leq X \leq b_2 \\ 0 & b_2 \leq X \end{cases}$$

membership function of fuzzy variables Z, PS and PM (n=2, 3, 4)

$$\mu_A(X) = \max(0, 1 - |x - b_n|/(b_{n+1} - b_n))$$

membership function of fuzzy variable PB $$\mu_A(X) = \begin{cases} 0 & X \leq b_4 \\ (X - b_4)/(b_5 - b_4) & b_4 \leq X \leq b_5 \\ 1 & b_5 \leq X \end{cases}$$

As described above, the conventional control scheme provides an output value for an input value in one-to-one relationship and the selected output value is not necessarily optimal, whereas the application of the fussy theory enables more flexible control based on the control rule and membership function, allowing the involvement of subjective knowledge and ambiguous information for producing the control output.

Although in the foregoing embodiments the feed rate detection circuit 300 counts the number of revolutions of a roller, which is in contact with the consumable electrode wire 1400 and coupled with an encoder or tachogenerator, alternative arrangements for the detection of feed rate include the use of interference of laser rays reflected on the wire and the use of the number of revolutions of the wire feed motor.

In this manner, the arc welding machine of the type of consumable electrode calculates the butt length and adjusts the welding power automatically based on the calculation result.

According to the arc welding machine of this invention, the optimal output waveform can be inferred from the immediate state of arc, which enables the achievement of stable and optimal arcing and facilitates arc welding for the workers. The machine enables the prediction of the next beginning of short-circuiting and arcing based on the immediate state of arc, which eliminates the delay of waveform control and ensures the transition to short-circuiting by eliminating small-scale short-circuiting through the control of short-circuit starting time, whereby the emergence of sputtering can be prevented, a smooth bead appearance can be realized based on uniform arcing, and the worker can have easily a stable and optimal arc. In addition, the machine frees the worker from the awkward re-adjustment of the output power in response to the variation of stickout length, prevents the degradation of quality of welding due to improper output adjustment or suspension of welding for the output re-adjustment and ensures the stable welding result irrespective of the degree of expertise of workers.

We claim:

1. An arc welding machine comprising:
   output control means for producing an arc output in accordance with an output control signal applied to said output control means;
   output detection means for measuring the arc output and for producing a feedback signal indicative of the arc output; and
   fuzzy inference control means, responsive to the feedback signal, for forming a welding current waveform and welding voltage waveform required to produce an optimum arc state which is obtained by implementing a fuzzy inference in accordance with a predetermined membership function and a predetermined rule and for outputting the welding current waveform and welding voltage waveform to said output control means as the output control signal.

2. An arc welding machine according to claim 1, wherein said output detection means includes a signal conversion means, responsive to an output arc voltage signal indicative of a voltage value of the arc output and an output arc current signal indicative of a current value of the arc output, for producing an output arc voltage value signal and an output arc current value signal, and a short-circuit event count means, responsive to the output arc voltage signal, for counting a number of events of contact between a welding wire acting as a consumable electrode and an object to be welded in a predetermined time period and for producing a short-circuit event count signal, and wherein said fuzzy inference control means includes base power setting means for selecting a base output current waveform and a base output voltage waveform from a memory and for outputting the base output current waveform and the base output voltage waveform as a base output signal, and fuzzy inference means, responsive to the base output signal, the output arc voltage value signal, the output arc current signal, and the short-circuit event count signal, for implementing a fuzzy inference in accordance with a predetermined membership function and a predetermined rule and for producing an output control signal including a welding output current waveform and a welding output voltage waveform necessary for provision of an optimum arc state.

3. An arc welding machine according to claim 1, wherein said output detection means includes current detection means for measuring an output current value and for producing a current value signal, voltage detection means for measuring an output voltage and for producing a voltage value signal, and short-circuiting/arcing period measuring means, responsive to the voltage value signal, for measuring a time interval beginning with a previous short-circuiting and ending with a generation of an arc and a time interval beginning with a generation of an arc and ending with a short-circuiting and for producing a short-circuit/arc period signal, and wherein said fuzzy inference control means includes fuzzy inference means, responsive to the current value signal, the voltage value signal, and the short-circuit/arc period signal, for implementing a fuzzy inference in accordance with a predetermined membership function and a predetermined rule, thereby to predict a succeeding short-circuiting time at least from a preceding short-circuiting time and a preceding arcing time, and for producing an inference signal, and waveform control means responsive to the inference signal for producing an output waveform signal for achieving an optimum state of arc.

4. An arc welding machine according to claim 1, wherein said output detection means includes current detection means for detecting a welding current, current value calculation means, responsive to an output of said current detection means, for calculating a calculated output including an output current mean value and an output current effective value, and wire feed rate detection means for detecting a feed sped of a wire which is consumable electrode, and wherein said fuzzy inference control means includes stickout length calculation means for calculating a distance between a welding object and an electrical conduction electrode from the calculated output provided by said current value calculation means and the wire feed rate detected by said wire feed rate detection means, fuzzy inference means, responsive to the distance calculated by said stickout length calculation means as an input variable, for effecting a fuzzy inference to infer an output setting value in accordance with a predetermined membership function and a predetermined rule, and output setting means for selecting an optimum output value from a data base in response to the output setting value and for setting a welding output based on the optimum output value.

5. An arc welding machine comprising:
(a) output control means for producing an arc output in accordance with an output control signal applied thereto;
(b) output detection means for measuring the arc output and for producing a feedback signal indicative of the arc output; said output detection means comprising:
  (i) a signal conversion means, responsive to an output arc voltage signal indicative of a voltage value of an arc and an output arc current signal indicative of a current value of the arc, for producing an output arc voltage value signal and an output arc current value signal, and
  (ii) a short-circuit event count means, responsive to the output arc voltage value signal, for counting a number of events of contact between a welding wire acting as a consumable electrode and an object to be welded in a predetermined time period, and
(c) fuzzy inference control means, responsive to the feedback signal, for forming a welding current waveform and welding voltage waveform required to produce an optimum arc state which is obtained by implementing a fuzzy inference in accordance with a predetermined membership function and a predetermined rule and for outputting the welding current waveform and welding voltage waveform to said output control means as the output control signal, said fuzzy inference control means comprising:
  (i) base power setting means for selecting a base output current waveform and a base output voltage waveform from a memory data bank and for outputting the base output current waveform and the base output voltage waveform as a base output signal, and
  (ii) fuzzy inference means, responsive to the base output signal, the output arc voltage signal, the output arc current value signal, and the short-circuit event count signal, for implementing a fuzzy inference in accordance with a predetermined membership function and a predetermined rule and for producing an output control signal including a welding output current waveform and a welding output voltage waveform necessary for provision of an optimum arc state.

6. An arc welding machine comprising:
(a) output control means for producing an arc output in accordance with an output control signal applied thereto;
(b) output detecting means for measuring the arc output and for producing a feedback signal indicative of the arc output, said output detection means comprising:
  (i) current detection means for measuring an output current value and for producing a current value signal,
  (ii) voltage detection means for measuring an output voltage value and for producing a voltage value signal, and
  (iii) short-circuiting/arcing period measuring means, responsive to the voltage value signal, for measuring a time interval beginning with a previous short-circuiting and ending with a generation of an arc and a time interval beginning with a generation of an arc and ending with short-circuiting and for producing a short-circuit/arc period signal; and
(c) fuzzy inference control means, responsive to the feedback signal, for forming a welding current waveform and welding voltage waveform required to produce an optimum arc state which is obtained by implementing a fuzzy inference in accordance with a predetermined membership function and a predetermined rule and for outputting the welding current waveform and welding voltage waveform to said output control means as the output control signal, said fuzzy inference control means comprising:
  (i) fuzzy inference means, responsive to the current value signal, the voltage value signal, and the short-circuit/arc period signal, for implementing a fuzzy inference in accordance with a predetermined membership function and a predetermined rule, theory to predict a succeeding short-circuiting time at least from a preceding short-circuiting time and arcing time, and for producing an inference signal, and
  (ii) waveform control means, responsive to the inference signal, for producing an output waveform signal for achieving an optimum state of arc.

* * * * *